(12) United States Patent
Sokalski (10) Patent No.: US 10,202,901 B1
(45) Date of Patent: Feb. 12, 2019

(54) INFINITELY VARIABLE COMPRESSION RATIO MECHANISM OF A RECIPROCATING DOUBLE-ACTING PISTON-TYPE GAS COMPRESSOR

(71) Applicant: Mark Albert Sokalski, Rennerdale, PA (US)

(72) Inventor: Mark Albert Sokalski, Rennerdale, PA (US)

(*) Notice: Subject to any disclaimer, the term of this patent is extended or adjusted under 35 U.S.C. 154(b) by 0 days.

(21) Appl. No.: 16/152,174

(22) Filed: Oct. 4, 2018

Related U.S. Application Data (63) Continuation-in-part of application No. 15/819,084, filed on Nov. 21, 2017, now Pat. No. 10,119,463.

(60) Provisional application No. 62/432,011, filed on Dec. 9, 2016.

(51) Int. Cl.
| | |
|---|---|
| *F02B 75/04* | (2006.01) |
| *F01B 9/04* | (2006.01) |
| *F02D 15/02* | (2006.01) |
| *F02B 41/04* | (2006.01) |
| *F02B 75/02* | (2006.01) |
| *F16H 35/00* | (2006.01) |
| *F16H 1/46* | (2006.01) |

(52) U.S. Cl.
CPC ............ *F02B 75/048* (2013.01); *F01B 9/042* (2013.01); *F01B 2009/045* (2013.01); *F02B 41/04* (2013.01); *F02B 75/02* (2013.01); *F02B 2075/025* (2013.01); *F02B 2075/027* (2013.01); *F02D 15/02* (2013.01); *F16H 1/46* (2013.01); *F16H 35/008* (2013.01)

(58) Field of Classification Search
CPC .............. F02B 75/048; F02B 2075/027; F02B 2075/025; F02B 75/02; F02B 41/04; F01B 9/042; F01B 2009/045; F16H 1/46; F16H 35/008; F02D 15/02
See application file for complete search history.

(56) References Cited

U.S. PATENT DOCUMENTS

| | | | | |
|---|---|---|---|---|
| 4,395,880 A | * | 8/1983 | Berchowitz | F02G 1/044 |
| | | | | 60/518 |
| 5,482,015 A | * | 1/1996 | Fish | F02B 41/04 |
| | | | | 123/197.4 |

(Continued)

*Primary Examiner* — Hung Q Nguyen (57) ABSTRACT

A crank-piston mechanism for a reciprocating double-acting piston-type gas compressor that allows for infinitely variable compression ratios during operations. The mechanism includes a gear pin crankshaft, a forward piston-connecting rod, a rearward piston-connecting rod, a forward crosshead, a rearward tubular crosshead, and a tandem piston assembly. The forward piston-connecting rod and the rearward piston-connecting rod are each rotatably connected to the gear pin crankshaft about two parallel but offset axes. On the opposite end, the forward piston-connecting rod and the rearward piston-connecting rod are connected to the forward crosshead and the rearward tubular crosshead, respectively. Wherein, the forward crosshead is slidably mounted within the rearward tubular crosshead. The forward crosshead is connected to a forward piston from the tandem piston assembly and the rearward tubular crosshead is connected to a rearward piston from the tandem piston assembly. The forward piston and the rearward piston are aligned for reciprocating motion.

13 Claims, 7 Drawing Sheets

(56) References Cited

U.S. PATENT DOCUMENTS

| | | | | |
|---|---|---|---|---|
| 5,927,236 A | * | 7/1999 | Gonzalez | F02B 75/048 |
| | | | | 123/197.4 |
| 10,119,463 B2 | * | 11/2018 | Sokalski | F02B 75/04 |
| 2011/0036334 A1 | * | 2/2011 | De Gooijer | F02B 41/04 |
| | | | | 123/568.14 |

* cited by examiner

INFINITELY VARIABLE COMPRESSION RATIO MECHANISM OF A RECIPROCATING DOUBLE-ACTING PISTON-TYPE GAS COMPRESSOR

The current application is a continuation-in-part (CIP) application of a U.S. non-provisional application Ser. No. 15/819,084 filed on Nov. 21, 2017. The U.S. non-provisional application Ser. No. 15/819,084 claims a priority to a U.S. provisional application Ser. No. 62/432,011 filed on Dec. 9, 2016.

FIELD OF THE INVENTION

The present invention relates generally to alternative designs for reciprocating piston gas compressors. More specifically, the present invention is an infinitely variable adjusting compression ratio mechanism of a reciprocating double-acting piston-type gas compressor. The present invention is capable of simultaneously varying the top dead center positions of a tandem pair of opposing pistons during operation, thus capable of varying the compression ratio of the compressor and varying the compressor flow capacity and corresponding power input. The compression ratio may be varied anytime, at any speed, and instantaneously, thus allowing the compressor to be flow-controlled from zero flow to full flow capacity without varying the input speed while input power requirements are commensurable with the actual flow and pressure rise through the compressor.

BACKGROUND OF THE INVENTION

The present invention applies to all types of reciprocating piston compressors, similar machines, and devices as the present invention allows for varying the piston travel at both end stop positions of the double-action. Additionally, the present invention allows for two different pistons to travel in tandem, to adjust equally and simultaneously, and to operate similar to a single double-acting piston, but with an infinitely variable compression ratio adjustment.

The present invention is essentially a double-acting version of a prior invention applicable to internal combustion engine (known as the SOWDA engine). A reduction in energy or a reduced fuel consumption during reduced gas flow requirements, in addition to accurate flow control from zero flow to 100% flow for portable air compressors, large natural gas transmission compressors, industrial/process make-up and recycle compressors, etc., has become more and more critical to the economic stability and environmental stability of the earth. Presently, no apparatus or method provides a 100% turn-down flow control by providing an infinitely variable compression ratio to a positive displacement double-acting reciprocating compressor.

DETAIL DESCRIPTIONS OF THE INVENTION

All illustrations of the drawings are for the purpose of describing selected versions of the present invention and are not intended to limit the scope of the present invention.

The present invention generally relates to alternative designs for gas compressors. More specifically, the present invention is a balanced and rotating compact mechanism integrated into a reciprocating double-acting piston-type gas compressor which provides a means for managing and controlling the compression ratio(s) of the reciprocating double-acting piston-type gas compressor during operations for increased efficiency and accurate flow control.

For simplicity purposes, the present invention is disclosed as being implemented as a reciprocating compressor with a single cylinder. There are two main portions to the present invention. The first portion consists of the components and mechanisms to converts rotating motion into linear motion. The second portion consists of the linear movement components and mechanisms that receive, compress, and expel gas at specific inlet and outlet pressures. In particular, the first portion receives rotational motion and transfers the rotation motion into linear motion through a crank-like coupling. The first portion comprises a mirror-image planetary-gear assembly 23 with a gear pin crankshaft 1 that acts as a crank in the present invention and a forward connecting rod 5, an at least one rearward connecting rod 6. The second portion consists of the linear motion components and comprises a forward crosshead 9, a rearward tubular crosshead 10, a forward piston shaft 18, a rearward piston tube 19, a tandem piston assembly 14, a forward gas inlet and outlet assembly, a rearward gas inlet and outlet assembly.

Figure 1:
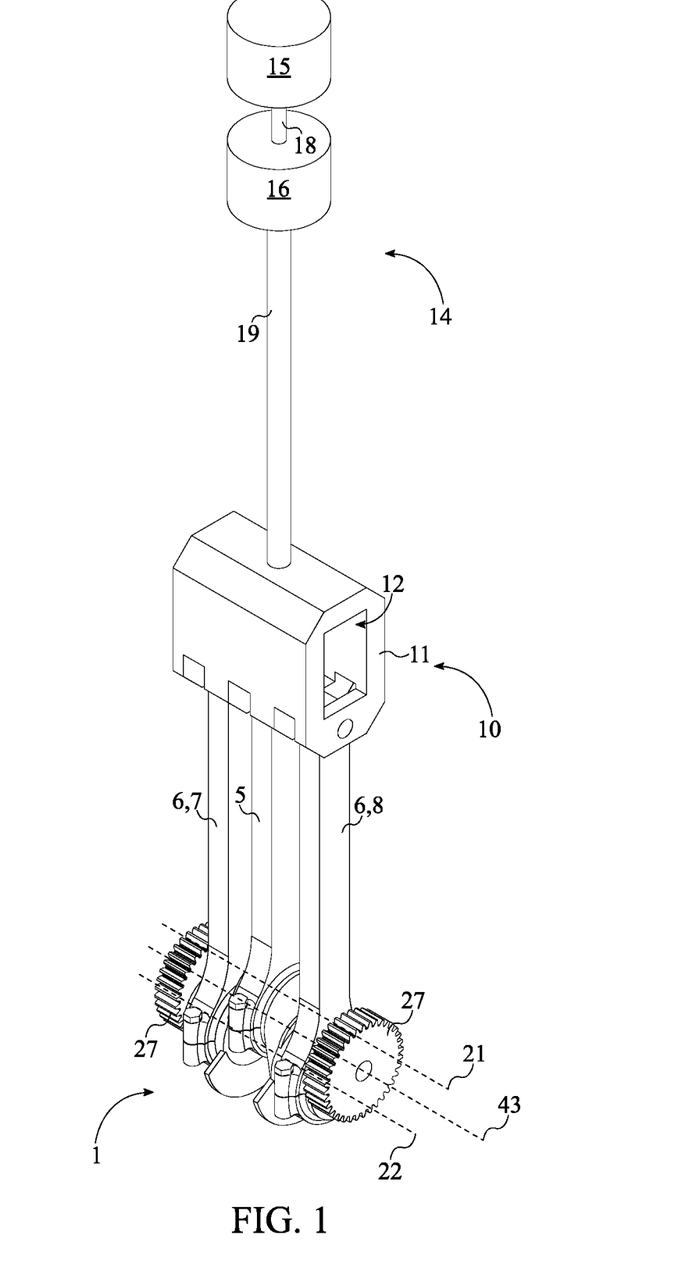
FIG. 1 is a perspective view of a portion of the present invention.
Figure 2:
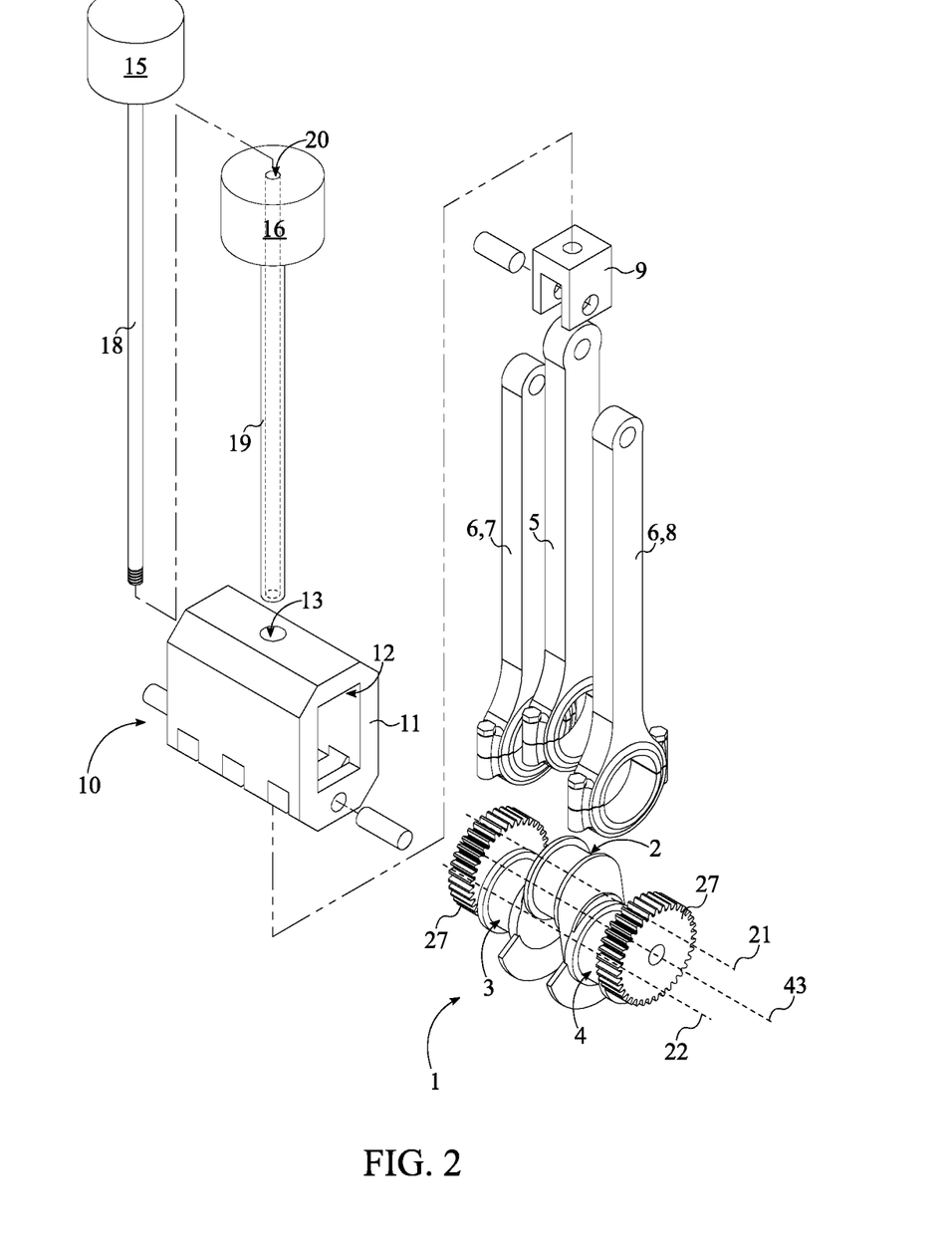
FIG. 2 is an exploded perspective view of the portion of the present invention.
Figure 4:
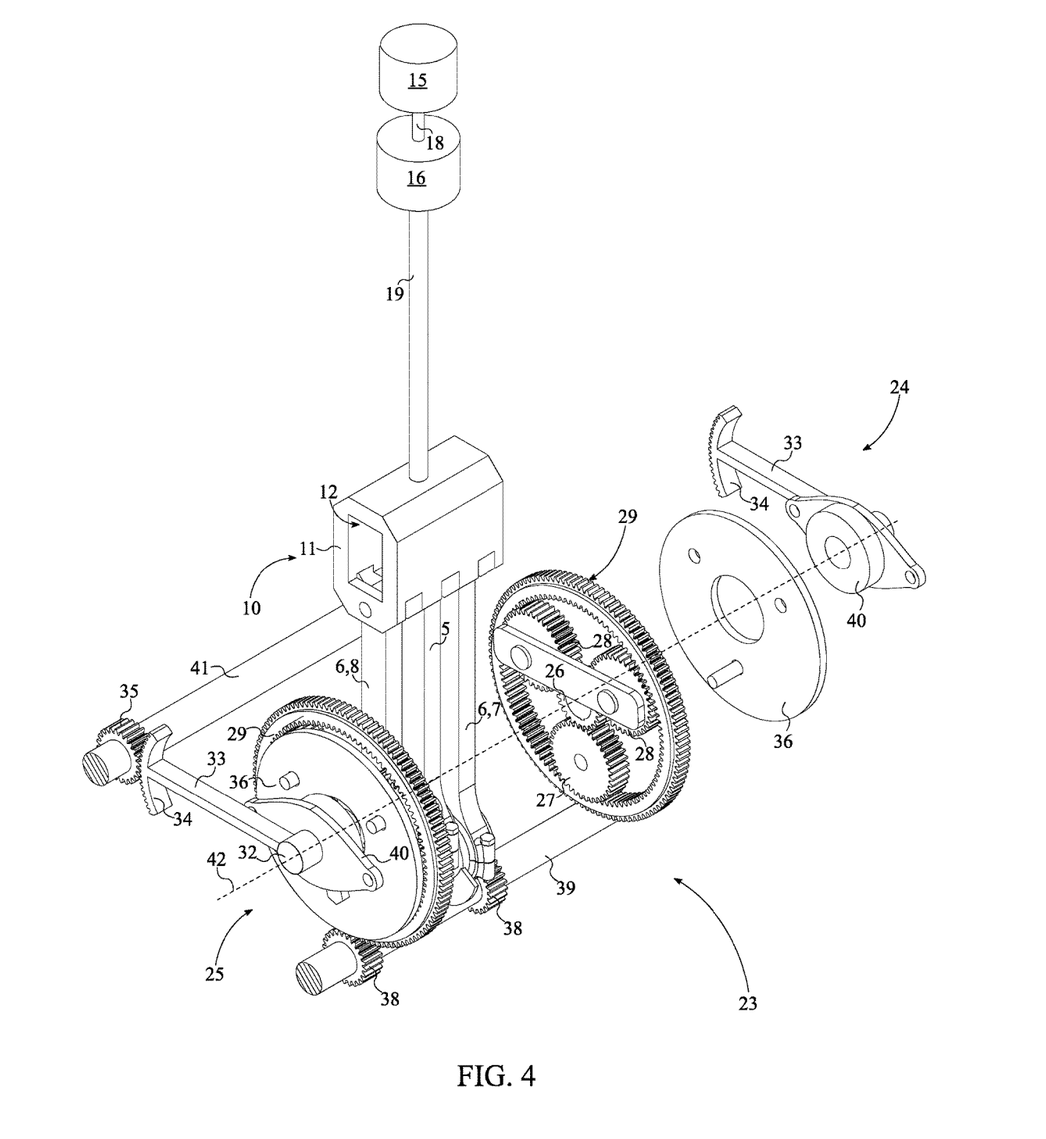
FIG. 4 is an exploded perspective view of the present invention.

Referring to FIG. 1, FIG. 2 and FIG. 4, the gear pin crankshaft 1 is the main component linking the mirror-image planetary-gear assembly 23 to the forward connecting rod 5, and at least one rearward connecting rod 6. The mirror-image planetary-gear assembly 23 with the gear pin crankshaft 1 assembly, the forward connecting rod 5, and the rearward connecting rod 6 form a crank-shaft mechanism for converting rotational motion into reciprocating linear motion. The forward connecting rod 5 and the rearward connecting rod 6 are each a connecting rod with a design similar to traditional connecting rods used in internal combustion engines The forward connecting rod 5 is terminally and rotatably connected to the gear pin crankshaft 1 about a forward piston rotation axis 21. Similarly, the rearward connecting rod 6 is terminally and rotatably connected to the gear pin crankshaft 1 about a rearward piston rotation axis 22; wherein, the forward piston rotation axis 21 and the rearward piston rotation axis 22 are positioned parallel and equally offset to each other. This offset distance is the defining feature of the present invention which allows for variable stroke distance. During operation, the overall travel distance of the forward connecting rod 5 and the rearward connecting rod 6 may be increased or decreased up to the offset distance by rotating the gear pin crankshaft 1. As a result, the travel position or stroke location, but not the stroke length, of the of the forward connecting rod 5 and the rearward connecting rod 6 may be adjusted. As the forward connecting rod 5 travel location translates closer to the gear pin crankshaft 1, the rearward connecting rod 6 travel location translates the same amount away from the gear pin crankshaft 1.

The forward connecting rod 5 couples to the forward crosshead 9, and the rearward connecting rod 6 couples to the rearward tubular crosshead 10. The forward crosshead 9 and rearward tubular crosshead 10 are the first two components that only move linearly. The forward crosshead 9 is a bar or block the links the forward connecting rod 5 to a forward piston 15 from the tandem piston assembly 14 to reduce and or eliminate sideways forces/pressures. The forward crosshead 9 is terminally and rotatably connected to the forward connecting rod 5, opposite to the gear pin crankshaft 1. It is preferred that forward crosshead 9 is a U-shaped block that is shaped and sized to receive the forward connecting rod 5 and is rotatably connected to the forward connecting rod 5 through a pivot pin. The rearward tubular crosshead 10 is a tubular structure which links the rearward connecting rod 6 to a rearward piston 16 from the tandem piston assembly 14 to reduce and or eliminate sideways forces/pressures. The rearward tubular crosshead 10 is terminally and rotatably connected to the rearward connecting rod 6, opposite the gear pin crankshaft 1. The forward piston 15 and the rearward piston 16 travel along the same path and therefore the forward crosshead 9 and the rearward tubular crosshead 10 must also travel along the same path. For this configuration, the forward crosshead 9 is slidably mounted and guided within the rearward tubular crosshead 10. Additionally, the forward crosshead 9 and the rearward tubular crosshead 10 are sized and designed for a complimentary fit. Resultantly, the rearward tubular crosshead 10 acts as a track for the forward crosshead 9, thus allowing for independent translation about a shared path.

The tandem piston assembly 14 draws in and compresses air or any gas through the forward piston 15 and the rearward piston 16. For this arrangement, the tandem piston assembly 14 is positioned adjacent to the rearward tubular crosshead 10, opposite the gear pin crankshaft 1. The forward piston 15 and the rearward piston 16 are each a disk or a short cylinder designed to move in a reciprocating fashion to compress gas, specifically air. The forward piston 15 moves along with the forward crosshead 9 and, thus, is mounted to the forward crosshead 9. The rearward piston 16 moves along with the rearward tubular crosshead 10 and, thus, is mounted to the rearward tubular crosshead 10.

Figure 5:
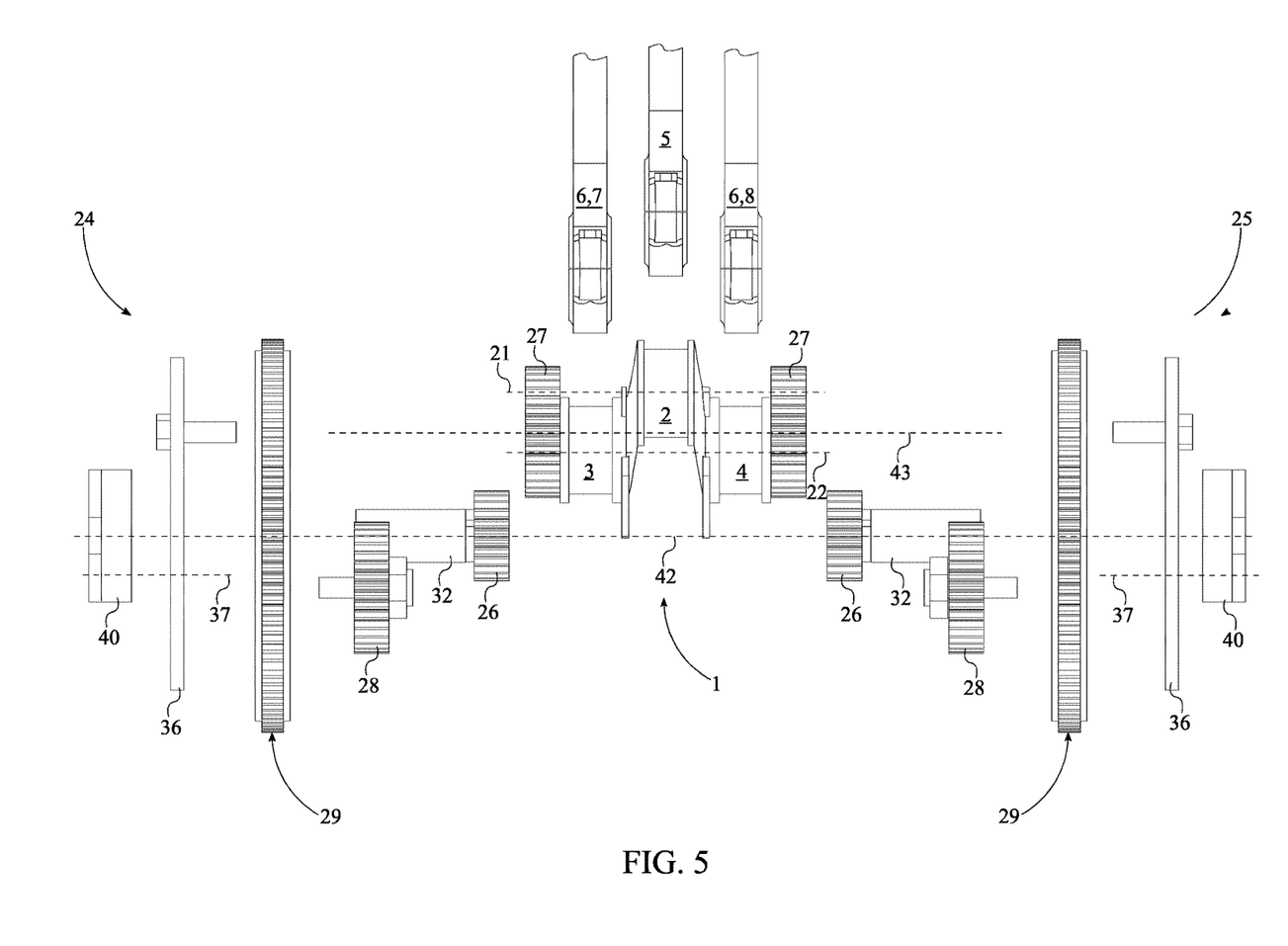
FIG. 5 is a front exploded view of the present invention, depicting a mirror-image planetary-gear assembly.

Referring to FIG. 2 and FIG. 5, it is preferred that the at least one rearward connecting rod 6 comprises a first rearward connecting rod 7 and a second rearward connecting rod 8 to ensure a force-balanced support for the rearward tubular crosshead 10. To accommodate the additional force-balance support, the gear pin crankshaft 1 comprises three cylindrical coupling points, a forward journal 2, a first rearward journal 3, and a second rearward journal 4. The forward journal 2 is concentrically aligned with the forward piston rotation axis 21. The forward journal 2 is sized complimentary to the forward connecting rod 5. Specifically, the forward connecting rod 5 is terminally and rotatably connected about the forward journal 2 about the forward piston rotation axis 21, similar to traditional journal coupling methods. The first rearward journal 3 and the second rearward journal 4 are each aligned with the rearward piston rotation axis 22 and couple to the first rearward connecting rod 7 and the second rearward connecting rod 8, respectively. More specifically, the forward journal 2 is terminally mounted to the first rearward journal 3. Opposite to the first rearward journal 3, the second rearward journal 4 is terminally mounted to the forward journal 2. Resultantly, the forward journal 2 is terminally mounted in between the first rearward journal 3 and the second rearward journal 4. The offset between the first rearward journal 3, the forward journal 2, and the second rearward journal 4 is 180 degrees. The resulting design of the gear pin crankshaft 1 is an elongated shaft with two but equal offset steps as seen in FIG. 5. Complimentary to the first rearward journal 3 and the second rearward journal 4, the first rearward connecting rod 7 and the second rearward connecting rod 8 are positioned parallel and opposite to each other across the forward connecting rod 5; specifically, the first rearward connecting rod 7 and the second rearward connecting rod 8 are a mirror image of each other, separated by the forward connecting rod 5. Additionally, the first rearward connecting rod 7 is terminally and rotatably connected about the first rearward journal 3 about rearward piston rotation axis 22. Similarly, the second rearward connecting rod 8 is terminally and rotatably connected to the second rearward journal 4 about the rearward piston rotation axis 22. Resultantly, the forward connecting rod 5, the first rearward connecting rod 7, and the second rearward connecting rod 8 rotate within parallel planes.

Figure 7:
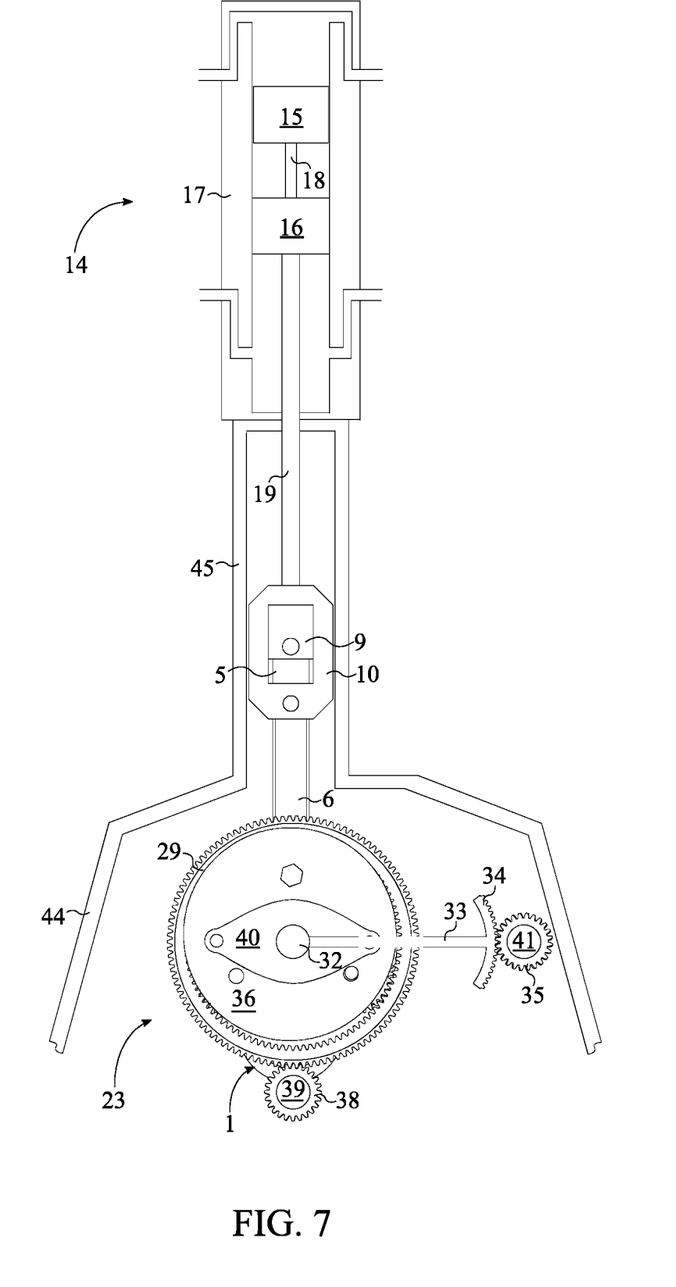
FIG. 7 is an internal side view of the present invention implemented as a single cylinder compressor.

Referring to FIG. 7, the tandem piston assembly 14 further comprises a cylinder 17, a forward piston shaft 18, a rearward piston tube 19, the rearward piston 16, a cylindrical bore 20, and the forward piston 15. The cylinder 17 is an elongated tubular structure which acts a guide and housing for the forward piston 15 and the rearward piston 16. Resultantly, the internal space of the cylinder 17 acts a compression chamber for gases undergoing gas intake by the movement of the forward piston 15 moving rearward and the rearward piston 16 moving forward and undergoing compression by the movement of the forward piston 15 moving forward and the rearward piston 16 moving rearward.

The rearward tubular crosshead 10 is mounted adjacent to and perpendicular to the gear pin crankshaft 1. The cylinder 17 is concentrically positioned with the rearward tubular crosshead 10; and, the cylinder 17 is mounted adjacent to the rearward tubular crosshead 10 and the forward crosshead 9, opposite the gear pin crankshaft 1. The cylinder 17, the forward piston 15, and the rearward piston 16 are sized complimentary to each other. The forward piston 15 and the rearward piston 16 are slidably mounted within the cylinder 17 to form two adjacent chambers to be utilized in conjunction or independently for compressing any gas. The rearward piston 16 is positioned closest to the gear pin crankshaft 1 to form a rearward compression chamber. The forward piston 15 is positioned furthest from the gear pin crankshaft 1 to form a forward compression chamber. The forward piston shaft 18 is an elongated rod that rigidly couples the forward crosshead 9 to the forward piston 15. Similarly, the rearward piston tube 19 is an elongated tube that rigidly couples the rearward tubular crosshead 10 to the rearward piston 16. The rearward piston tube 19 is connected between the rearward piston 16 and the rearward tubular crosshead 10, aligned with the central axis of the rearward piston 16 and the central axis of the rearward tubular crosshead 10. The forward piston shaft 18 is designed to fit within the rearward piston tube 19 to allow the forward piston 15 to move opposite relative to the rearward piston 16 movement during compression ratio adjustments. This movement requires the cylindrical bore 20, wherein the cylindrical bore 20 concentrically traverses through the rearward piston 16 and into the rearward piston tube 19. The cylindrical bore 20 is sized to receive the forward piston shaft 18 and, thus, allows the forward piston shaft 18 to traverse through the rearward piston 16. Specifically, the forward piston shaft 18 is slidably positioned within the rearward piston tube 19. The forward piston shaft 18 is connected in between the forward crosshead 9 and the forward piston 15. Resultantly, the forward crosshead 9, the forward piston shaft 18, and the forward piston 15 are capable of movement independent of the rearward tubular crosshead 10, the rearward piston tube 19, and the rearward piston 16.

In the preferred embodiment, the present invention is implemented as a double-acting piston-type gas compressor. In this embodiment, the compression chamber of the cylinder 17 is divided into two separate chambers, the rearward intake-and-compression chamber and the forward intake-and-compression chamber. The separate chambers also include independent gas intake ports. In particular, the forward intake-and-outlet assembly and the rearward intake-and-outlet assembly connect the separate chambers to a supply of gas and to a receiving tank for storing the compressed gas. The forward intake-and-outlet assembly and the rearward intake-and-outlet assembly each comprise an intake channel, an intake valve, an outlet channel, and an outlet valve. The forward intake-and-outlet assembly and the rearward intake-and-outlet assembly are positioned opposite to each other along the cylinder 17. The forward intake-and-outlet assembly is integrated into the cylinder 17, adjacent to the forward piston 15. The rearward intake-and-outlet assembly is integrated into the cylinder 17, adjacent to the rearward piston 16. The intake channel is an opening within the cylinder 17 for drawing gas into the cylinder 17. The outlet channel receives compressed gas and discharges the gas to a high-pressure discharge pipe or a storage tank. For efficiency purposes, referring to FIG. 7, the intake channel and the outlet channel are positioned opposite to each other, across the cylinder 17. The intake channel laterally traverses into the cylinder 17, intersecting the compression chamber. Similarly, the outlet channel laterally traverses into the cylinder 17, intersecting the compression chamber. The intake valve, not shown, controls the flow of gas along the intake channel. Thus, the intake valve is mechanically integrated into the cylinder 17, along the intake channel. The outlet valve, not shown, controls the flow of gas along the outlet channel. Thus, the outlet valve is mechanically integrated into the cylinder 17, along the outlet channel. Resultantly, the intake channel, the outlet channel, and the compression chamber are all in fluid communication with each other.

Figure 3:
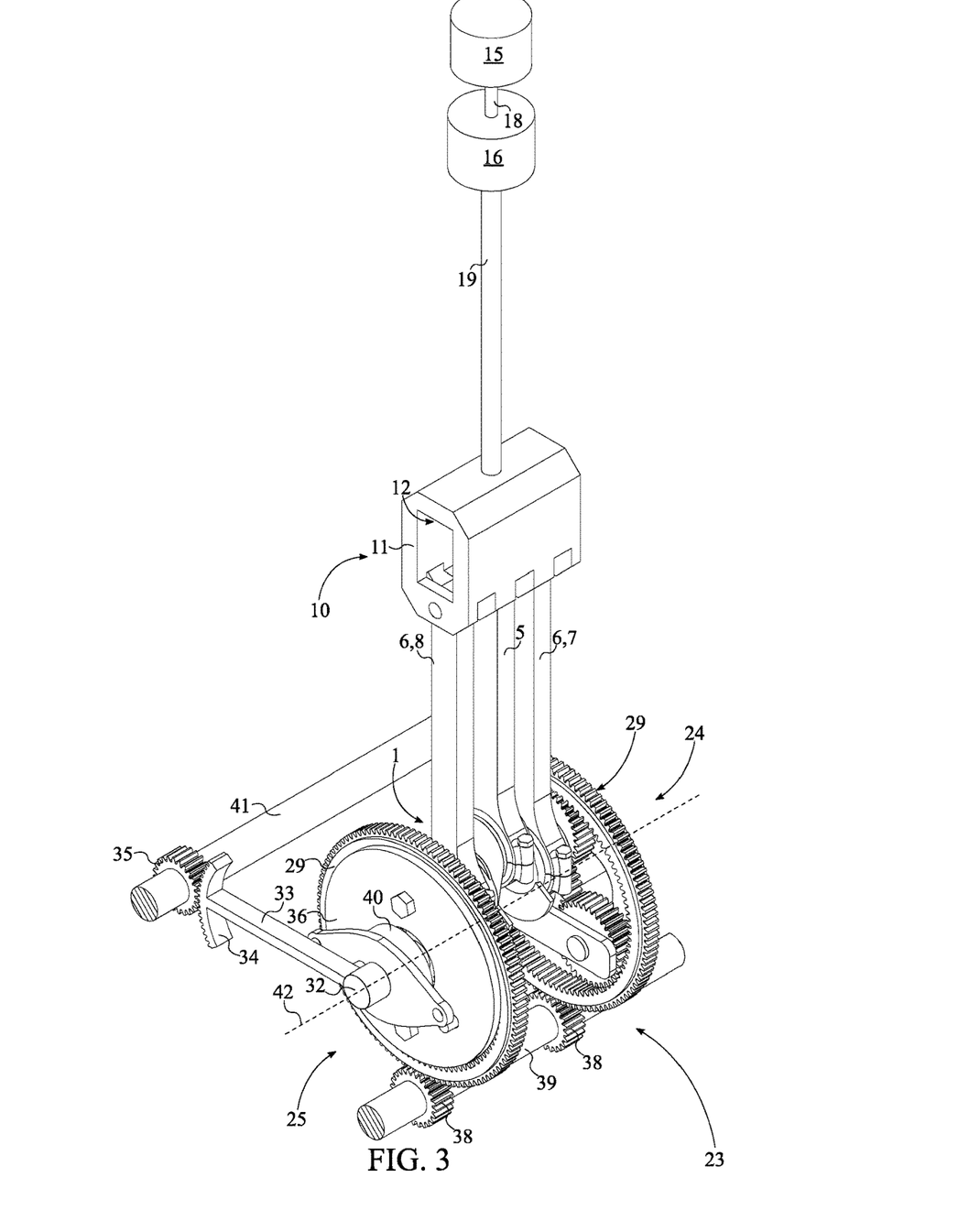
FIG. 3 is a perspective view of the present invention.

Referring to FIG. 2 and FIG. 3, in one embodiment of the present invention, the rearward tubular crosshead 10 comprises an elongated sliding body 11, an inner channel 12, and an inner cylindrical bore 13. The inner channel 12 is sized to act as a channel for the forward crosshead 9 to translate within. The inner channel 12 traverses into and along the elongated sliding body 11. Additionally, the inner channel 12 is oriented towards the gear pin crankshaft 1. The forward crosshead 9 is slidably positioned within and along the inner channel 12. The elongated sliding body 11 reciprocates due to the motion of the first rearward rod and the second rearward rod. Specifically, the first rearward connecting rod 7 and the second rearward connecting rod 8 are positioned opposite to each other, across the inner channel 12. As mentioned above, the first rearward connecting rod 7 and the second rearward connecting rod 8 are each terminally and rotatably connected to the elongated sliding body 11; it is preferred that the aforementioned connections are achieved through a pin coupling. The inner cylindrical bore 13 traverses through the elongated sliding body 11 from the inner channel 12 in order to receive the forward piston shaft 18. Specifically, the forward piston shaft 18 is positioned within the cylindrical bore 20 and is terminally connected to the forward crosshead 9 at one end and to the forward piston 15 at the other end. The rearward piston tube 19 overlaps the forward piston shaft 18 and, thus, is positioned adjacent to the elongated sliding body 11, opposite the forward crosshead 9. Additionally, the rearward piston tube 19 is connected to the sliding body, about the inner cylindrical bore 13.

Referring to FIG. 2, FIG. 3, and FIG. 4, the mirror-image planetary-gear assembly 23 in conjunction with the gear pin crankshaft 1 act as a crank mechanism. The mirror-image planetary-gear assembly 23 receives rotational motion and through the gear pin crankshaft 1, the forward connecting rod 5, the rearward connecting rod 6, the forward crosshead 9, the rearward tubular crosshead 10, the forward piston shaft 18, and the rearward piston tube 19 transfers and transforms said motion into reciprocating translation for the forward piston 15 and the rearward piston 16. Additionally, and more importantly, the mirror-image planetary-gear assembly 23 and the gear pin crankshaft 1 vary and control the overall travel end distance of the forward piston 15 and the rearward piston 16, thus controlling the overall compression ratio of the present invention.

The mirror-image planetary-gear assembly 23 further comprises a first planetary-gear assembly 24 and a second planetary-gear assembly 25. The first planetary-gear assembly 24 and the second planetary-gear assembly 25 are each an epicyclic gear system comprising a sun gear 26, a primary planet gear 27, a plurality of secondary planet gears 28, and a ring gear 29. Referring to FIG. 3 and FIG. 5, the first planetary-gear assembly 24 and the second planetary-gear assembly 25 are mounted offset from each other to symmetrically support the gear pin crankshaft 1 from opposing sides. More specifically, the sun gear 26 from the first planetary-gear assembly 24 and the sun gear 26 from the second planetary-gear assembly 25 are concentrically positioned with each other about a main rotation axis 42. As such, the first planetary-gear assembly 24 and the second planetary-gear assembly 25 are mounted and centered about the main rotation axis 42. Similar to traditional designs, the sun gear 26 is a spur gear of similar tooth size to the planet gears and acts as the center support member for the primary planet gear 27, the plurality of secondary planet gears 28, and the ring gear 29. The sun gear 26 acts a structural member in order to support the primary planet gear 27, the plurality of secondary planet gears 28, and the ring gear 29. Additionally, in general, when the sun gear 26 is rotated, the primary planet gear 27, and the plurality of secondary planet gears 28 are rotated about their respective axis. This configuration, in turn, rotates the gear pin crankshaft 1 and, therefore, raising or lowering the top dead center (TDC) height of the forward piston 15 and the rearward piston 16 and changing the compression ratio.

Figure 6:
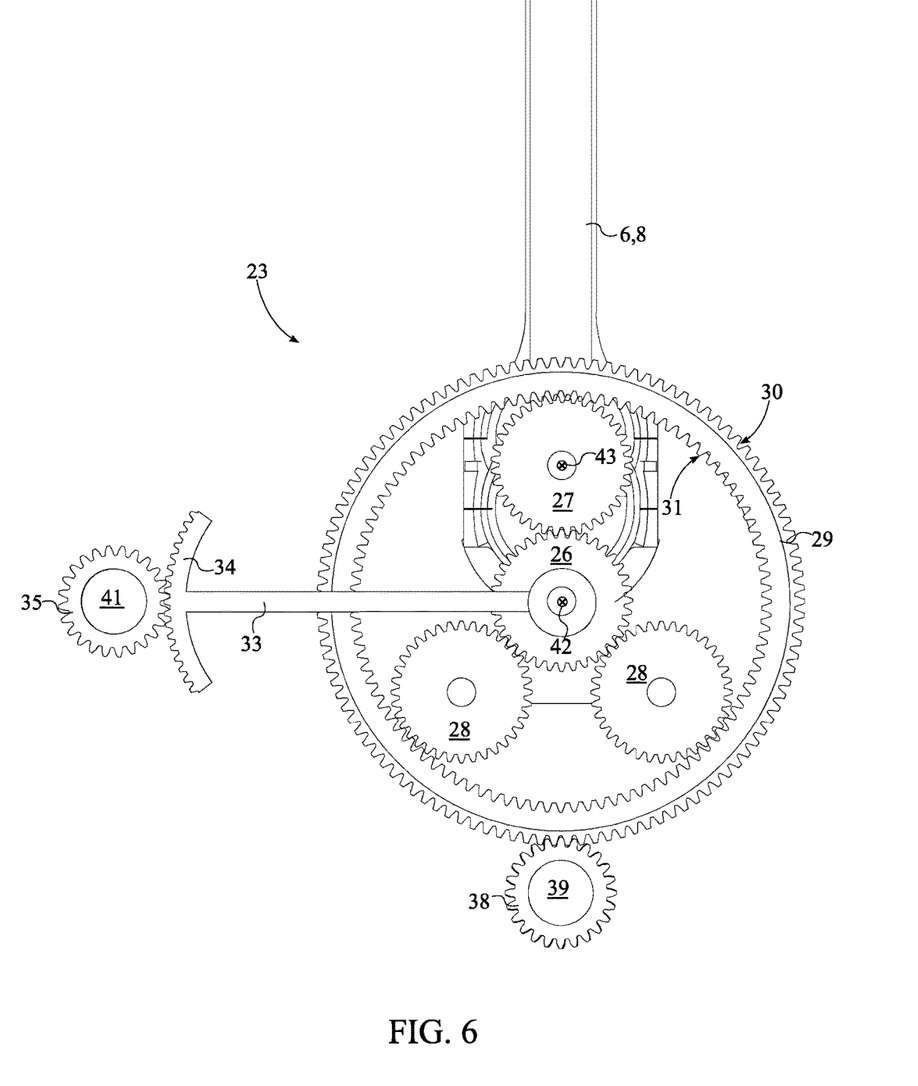
FIG. 6 is a side view of a partially internal view of the present invention.

Referring to FIG. 6, the primary planet gear 27 and each of the plurality of secondary planet gears 28 are radially distributed about the sun gear 26 and are each a spur gear that is mechanically engaged to the sun gear 26. Similar to traditional designs, the primary planet gear 27 and each of the plurality of secondary planet gears 28 revolve about the sun gear 26, i.e. the main rotation axis 42. The primary planet gear 27 of the first planetary-gear assembly 24 and the primary planet gear 27 of the second planetary-gear assembly 25 support the gear pin crankshaft 1 to transfer reciprocating motion to the forward piston 15 and the rearward piston 16. The plurality of secondary planet gears 28 assists in the transmission of torsional forces, counter-balances the primary planet gear 27, and support the ring gear 29 such that the ring gear 29 can symmetrically rotate about the main rotation axis 42. The ring gear 29 is mounted coaxial with the sun gear 26 and mechanically engages with the primary planet gear 27 and each of the plurality of secondary planet gears 28. Thus, the ring gear 29 encompasses the sun gear 26, the primary planet gear 27, and the plurality of secondary planet gears 28. When the primary planet gear 27 rotates about the sun gear 26, the ring gear 29 is rotated by the primary planet gear 27 and the plurality of secondary planet gears 28 about the main rotation axis 42 because the sun gear 26 is held fixed. The sun gear 26 only rotates slightly when varying the compression ratio.

The gear pin crankshaft 1 contains eccentric journals which act as the crankpin elements to mechanically couple the mirror-image planetary-gear assembly 23 to the forward connecting rod 5 and the rearward connecting rod 6. Referring to FIG. 5, the primary planet gear 27 from the first planetary-gear assembly 24 and the primary planet gear 27 from the second planetary-gear assembly 25 are concentrically positioned with each other along a shared rotation axis 43 and support the gear pin crankshaft 1. More specifically, the gear pin crankshaft 1 is torsionally and eccentrically connected in between the primary planet gear 27 from the first planetary-gear assembly 24 and the primary planet gear 27 from the second planetary-gear assembly 25. Specifically, the forward piston rotation axis 21 and the rearward piston rotation axis 22 are positioned parallel and offset with the shared rotation axis 43. Resultantly, the gear pin crankshaft 1 rotates and travels along the same path as the primary planet gear 27. This configuration is key in varying the compression ratios within the compression chamber of the present invention. Resultantly, the forward connecting rod 5, the forward crosshead 9, the forward piston shaft 18, and the forward piston 15 are all interlinked and connected to the gear pin crankshaft 1 at a 180-degree offset from the rearward connecting rod 6, the rearward tubular crosshead 10, the rearward piston tube 19, and the rearward piston 16.

As the primary planet gear 27 travels about the main rotation axis 42, the gear pin crankshaft 1 follows the same path. This circular motion about the main rotation axis 42 is converted to reciprocating motion for the forward piston 15 and the rearward piston 16 through the first rearward connecting rod 7, the second rearward connecting rod 8, the forward connecting rod 5, the forward crosshead 9, the rearward tubular crosshead 10, the forward piston shaft 18, and the rearward piston tube 19; similar to traditional crank-type mechanisms. In general, the first rearward connecting rod 7, the second rearward connecting rod 8, the forward connecting rod 5, the forward crosshead 9, the rearward tubular crosshead 10, the forward piston shaft 18, and the rearward piston tube 19 make up a connecting-rod assembly.

When the mirror-image planetary-gear assembly 1 rotates about the main rotation axis 42, the tandem piston assembly 14 moves linearly and reciprocates about a stroke length equivalent to the diameter of the circumference created by the gear pin crankshaft 1 rotating around the main rotation axis 42. This stroke length moves the forward piston 15 and the rearward piston 16 equally and draws in and compresses gas through the forward piston 15 and the rearward piston 16. The mirror-image planetary-gear assembly 23 receives rotational motion through the ring gear 29 of the first planetary-gear assembly 24 and the ring gear 29 of the second planetary-gear assembly 25. The rotational motion is then transferred to the primary planet gear 27 and the plurality of secondary planet gears 28 to rotate the gear pin crankshaft 1 about the main rotation axis 42, similar to traditional planetary gear systems. A variety of means may be used to drive or impart rotational motion to the ring gear 29.

The overall method of the present invention is disclosed in relation to both the first planetary-gear assembly 24 and the second planetary-gear assembly 25; in particular, the subcomponents of the first planetary-gear assembly 24 move identical with the same subcomponents of the second planetary-gear assembly 25. When rotational motion is imparted onto the ring gear 29, due to the characteristics of epicyclical gearings, the primary planet gear 27 and the plurality of secondary planet gears 28 begin to rotate about the sun gear 26, as the sun gear 26 remains fixed. This configuration, in turn, rotates the gear pin crankshaft 1 about the main rotation axis 42 and forces a proximal end of the coupled connecting-rod assembly to follow the same path. The distal end of the connecting-rod assembly is restricted to linear motion and therefore moves in a reciprocating motion in response to the gear pin crankshaft 1 rotating about the main rotation axis 42. Resultantly, the forward piston 15 and the rearward piston 16 also travel in a reciprocating motion within the cylinder 17, similar to conventional compressor designs. The reciprocating motion draws in, compresses, and expels compressed gas. In order to vary the volume within the forward compression chamber and the volume of the rearward compression chamber, the TDC height of the forward piston 15 and the TDC height of the rearward piston 16 are altered. The TDC height for the forward piston 15 is defined by the location at which point the forward piston 15 is furthest from the gear pin crankshaft 1. Alternatively, the TDC height for the rearward piston 16 is defined by the location at which point the rearward piston 16 is closest to the gear pin crankshaft 1. The TDC heights can be altered by uniformly rotating both the sun gear 26 of the first planetary-gear assembly 24 and the sun gear 26 of the second planetary-gear assembly 25.

The following description of movement is disclosed in relation to both the first planetary-gear assembly 24 and the second planetary-gear assembly 25. To increase or decrease the TDC heights, the sun gear 26 is partially rotated. Specifically, because the forward rotation axis and the rearward piston rotation axis 22 are positioned eccentric relative to the shared rotation axis 43, the TDC heights can be modified through the rotation of the primary planet gear 27, i.e. partial rotation of the sun gear 26. In other words, the primary planet gear 27 travels along a circular path around the sun gear 26 while the gear pin crankshaft 1 rotates about shared rotation axis 43 and the main rotation axis 42. For each cycle, at 0 degrees and 180 degrees positions, the gear pin crankshaft 1 always returns to the same orientation as long as the sun gear 26 has not moved; wherein a single cycle is defined by a single full 360-degree rotation of the primary planet gear 27 about the main rotation axis 42. Because of the characteristics of epicyclical gearing, partially rotating the sun gear 26 rotates the relative position of primary planet gear 27 and each of the plurality secondary planet gears. The partial rotation of sun gear 26 alters the orientation of the primary planet gear 27 and the orientation of the gear pin crankshaft 1 at each increment of 0 degrees and 180 degrees. Because of the eccentric configuration, rotating the gear pin crankshaft 1 moves the forward piston rotation axis 21 and the rearward piston rotation axis 22 further or closer to the main rotation axis 42 at the 0 degrees and 180 degrees, thus effectively increasing or decreasing the TDC heights and the compression ratios within the compression chamber.

The forward piston 15 and the rearward piston 16 move equally and in opposite directions when the gear pin crankshaft 1 is rotated about the shared rotation axis 43. Thereby, the forward piston 15 and the rearward piston 16 either move closer together yielding less volumetric displacement and a lower compression ratio or move farther apart yielding more volumetric displacement and a higher compression ratio.

In the preferred embodiment of the present invention, the gearing and sizing between the primary planet gear 27, the plurality of secondary planet gears 28, the sun gear 26, and the ring gear 29 may be altered to achieve a number of different cycles, different TDC heights, different chamber sizes, and more. For the preferred embodiment of the present invention, a main tooth ratio between the sun gear 26, the plurality of secondary planet gears 28 and the primary planet gear 27, and the ring gear 29 is 1:1:3, respectively. Resultantly, for every full rotation of the ring gear 29 about the main rotation axis 42, the primary planet gear 27 rotates a three-fourth (¾) times about the main rotation axis 42 and one and one-half (1.5) times about the shared rotational axis 43.

Referring to FIG. 7, the present invention further comprises a compressor block 44 and a crosshead housing 45. The compressor block 44 houses and protects the mirror-image planetary-gear assembly 23, the gear pin crankshaft 1, and a portion of the connecting-rod assembly. The crosshead housing 45 houses and protects a portion of the connecting-rod assembly and supports the compression cylinder 17. The first planetary-gear assembly 24 and the second planetary-gear assembly 25 each further comprise a bearing 40 and a ratio-adjustment mounting shaft 32. The ratio-adjustment mounting shaft 32 controls the radial displacement of the sun gear 26, thus varying the relative position of the primary planet gear 27 and, equally varying the forward movement of the forward piston 15 and the rearward movement of the rearward piston 16; therefore, equally varying the compression ratios of the forward compression chamber and the rearward compression chamber. The ratio-adjustment mounting shaft 32 is positioned adjacent to the sun gear 26, opposite the gear pin crankshaft 1. Additionally, the ratio-adjustment mounting shaft 32 is torsionally and axially connected to the sun gear 26 such that any rotational movement of the ratio-adjustment mounting shaft 32 will translate to an equivalent rotational movement of the sun gear 26. The bearing 40 rotatably mounts the ratio-adjustment mounting shaft 32 within the compressor block 44. More specifically, the mirror-image planetary-gear assembly 23, the gear pin crankshaft 1, and the connecting-rod assembly are positioned within the compressor block 44. The bearing 40 is adjacently connected within the compressor block 44, adjacent to the sun gear 26. The ratio-adjustment mounting shaft 32 is attached within the bearing 40 such that the ratio-adjustment mounting shaft 32 is rotatably mounted to the compressor block 44 with the bearing 40. This configuration is identical to the first planetary-gear assembly 24 and the second planetary-gear assembly 25. Additionally, the crosshead housing 45 is oriented perpendicular to the gear pin crankshaft 1 and is laterally mounted to the compressor block 44. The rearward tubular crosshead 10 is slidably mounted within the crosshead housing 45. Furthermore, the tandem piston assembly 14 is adjacently mounted to the crosshead housing 45. Specifically, the compressor cylinder 17 is oriented along the crosshead housing 45. In alternative embodiments, different means and mechanisms may be used to mount the mirror-image planetary-gear assembly 23 within the compressor block 44.

The ratio-adjustment mounting shaft 32 may be controlled through a variety of means. In the preferred embodiment of the present invention, the ratio-adjustment mounting shaft 32 is controlled by a ratio-control shaft 41. More specifically, the ratio-control shaft 41 is mechanically coupled to the ratio-adjustment mounting shaft 32 of the first planetary-gear assembly 24 and the ratio-adjustment mounting shaft 32 of the second planetary-gear assembly 25. For this coupling, the first planetary-gear assembly 24 and the second planetary-gear assembly 25 each further comprise a control arm 33, an arc gear 34, and a drive-adjustment gear 35 to mechanically couple the ratio-control shaft 41 to the ratio-adjustment mounting shaft 32. The ratio-control shaft 41 is rotatably mounted within the compressor block 44, in particular the ratio-control shaft 41 is mounted parallel and offset to the ratio-adjustment mounting shaft 32. The control arm 33 is an elongated plate or rod that is terminally and perpendicularly connected to the ratio-adjustment mounting shaft 32. The arc gear 34 is a semi-annular gear that is terminally connected to the control arm 33, opposite to the ratio-adjustment mounting shaft 32. The drive-adjustment gear 35 is concentrically connected about the ratio-control shaft 41 and is mechanically engaged with the drive-adjustment gear 35. Resultantly, rotational motion of the ratio-control shaft 41 raises or lowers one end of the control arm 33 through the mechanical engagement between the arc gear 34 and the drive-adjustment gear 35. This engagement rotates the ratio-adjustment mounting shaft 32 and the sun gear 26, and resultantly changes the compression ratio. In relation to the overall system, the ratio-control shaft 41 is mechanically coupled to the ratio-adjustment mounting shaft 32 of the first planetary-gear assembly 24 and the ratio-adjustment mounting shaft 32 of the second planetary-gear assembly 25. It is preferred that the arc gear 34 and the drive-adjustment gear 35 are sized such that rotation of the arc gear 34 rotates the sun gear 26 equally, which equally rotates the primary planet gear 27, which equally moves the forward piston 15 and the rearward piston 16.

The present invention utilizes a multitude of methods in order to ensure that the mirror-image planetary-gear assembly 23 is adequately balanced during operations, thus decreasing vibration, decreasing energy losses, and increasing efficiency of the compressor. More specifically, the first planetary-gear assembly 24 and the second planetary-gear assembly 25 each further comprise an eccentric annular external-counterweight 36 and a counterweight coupling plate. The eccentric annular external-counterweight 36 is a circular plate with a hole that is positioned off-center, thus positioning a majority of its weight one half of the circular plate. The eccentric annular external-counterweight 36 is positioned adjacent to the primary planet gear 27 and the plurality of secondary planet gears 28, opposite the gear-pin assembly. Additionally, the eccentric annular external-counterweight 36 is positioned around the ratio-adjustment mounting shaft 32, thus allowing the eccentric annular external-counterweight 36 to rotate without engaging the ratio-adjustment mounting shaft 32. The eccentric annular external-counterweight 36 is designed to rotate about the main rotation axis 42 with the primary planet gear 27 and the plurality of secondary planet gears 28 in order to counter balance the weight of the gear pin crankshaft 1, the connecting-rod assembly, and any forces associated with the aforementioned components. As such, the eccentric annular external-counterweight 36 is rotatably mounted to the primary planet gear 27 and each of the plurality of secondary planet gears 28. Additionally, a center of gravity 37 of the eccentric annular external-counterweight 36 and the shared rotation axis 43 are positioned opposite to each other about the ratio-adjustment mounting shaft 32.

The counterweight coupling plate adds to the eccentric annular external-counterweight 36. The counterweight coupling plate is an elongated plate, preferably of a rectangular shape, that is attached to the plurality of secondary planet gears 28. More specifically, the counterweight coupling plate is positioned in between the first planetary-gear assembly 24 and the second planetary-gear assembly 25. The counterweight plate is rotatably mounted to each of the plurality of secondary planet gears 28. It is understood that the design, shape, weight, and material configuration of the eccentric annular external-counterweight 36 and the counterweight coupling plate is subject to change.

Additionally, in the preferred embodiment of the present invention, the gear pin crankshaft 1 further comprises a first counterweight plate and a second counterweight plate. The first counterweight plate and the second counterweight plate apply counterbalance to the shared rotational axis where out-of-balance is created by the eccentrically positioned first rearward journal 3 and the second rearward journal 4. The first counterweight plate and the second counterweight plate are each a semi-circular plate. The first counterweight plate is connected about the first rearward journal 3. Similarly, the second counterweight plate is connected about the second rearward journal 4.

Referring to FIG. 4 and FIG. 6, the mirror-image planetary-gear assembly 23 is powered by a driving power shaft 39. The driving power shaft 39 is mounted within the compressor block 44; and the driving power shaft 39 is positioned parallel and offset to the main rotation axis 42. The driving power shaft 39 is torsionally connected to a motor, or another similar source of rotational power, in order to power the present invention. To transfer rotational motion from the driving power shaft 39 to the mirror-image planetary-gear assembly 23, the driving power shaft 39 is torsionally coupled to the ring gear 29 from the first planetary-gear assembly 24 and the ring gear 29 from the second planetary-gear assembly 25. In one embodiment, the ring gear 29 is coupled to the driving power shaft 39 through a chain. In the preferred embodiment, the ring gear 29 is coupled to the driving power shaft 39 through a gear mesh. More specifically, the ring gear 29 is an internal-external ring gear 30 that comprises an external ring gear 30 and an internal ring gear 29. The internal ring gear 29 meshes with and is designed complimentary to the primary planet gear 27 and each of the plurality of secondary planet gears 28. More specifically, the primary planet gear 27 and each of the plurality of secondary planet gears 28 are mechanically engaged with the internal ring gear 29. The first planetary-gear assembly 24 and the second planetary-gear assembly 25 each further comprise a driving gear 38. The driving gear 38 is concentrically connected about the driving power shaft 39 and is positioned coplanar with the internal-external ring gear 30. In order to transfer rotational energy/motion, the external ring gear 30 is mechanically engaged to the driving gear 38.

Although the invention has been explained in relation to its preferred embodiment, it is to be understood that many other possible modifications and variations can be made without departing from the spirit and scope of the invention as hereinafter claimed.

What is claimed is:

1. An infinitely variable compression ratio mechanism of a reciprocating double-acting piston-type gas compressor comprises:
   a gear pin crankshaft;
   a forward piston-connecting rod;
   an at least one rearward piston-connecting rod;
   a forward crosshead;
   a rearward tubular crosshead;
   a forward piston shaft;
   a rearward piston tube;
   a tandem piston assembly;
   the forward piston-connecting rod being terminally and rotatably connected to the gear pin crankshaft about a forward piston rotation axis;
   the rearward piston-connecting rod being terminally and rotatably connected to the gear pin crankshaft about a rearward piston rotation axis;
   the forward piston rotation axis and the rearward piston rotation axis being positioned parallel and equally offset to each other;
   the forward crosshead being terminally and rotatably connected to the forward piston-connecting rod, opposite the gear pin crankshaft;
   the rearward tubular crosshead being terminally and rotatably connected to the rearward-piston connecting rod, opposite the gear pin crankshaft;
   the forward crosshead being slidably mounted and guided within the rearward tubular crosshead;
   the tandem piston assembly being positioned adjacent to the rearward tubular crosshead, opposite the gear pin crankshaft;
   a forward piston from the tandem piston assembly being mounted to the forward crosshead; and
   a rearward piston from the tandem piston assembly being mounted to the rearward tubular crosshead.

2. The infinitely variable compression ratio mechanism of a reciprocating double-acting piston-type gas compressor as claimed in claim 1 comprises:
   the at least one rearward piston-connecting rod comprises a first rearward rod and a second rearward rod;
   the gear pin crankshaft comprises a forward journal, a first rearward journal, and a second rearward journal;
   the forward journal being concentrically aligned with the forward piston rotation axis;
   the first rearward journal being terminally mounted to the forward journal;
   the second rearward journal being terminally mounted to the forward journal, opposite the first rearward journal;
   the first rearward journal and the second rearward journal being concentrically aligned with the rearward piston rotation axis;
   the forward piston-connecting rod being terminally and rotatably connected about the forward journal about the forward piston rotation axis;
   the first rearward rod and the second rearward rod being positioned parallel and opposite to each other across the forward piston-connecting rod;
   the first rearward rod being terminally and rotatably connected about the first rearward journal about the rearward piston rotation axis; and
   the second rearward rod being terminally and rotatably connected about the second rearward journal about the rearward piston rotation axis.

3. The infinitely variable compression ratio mechanism of a reciprocating double-acting piston-type gas compressor as claimed in claim 1 comprises:
   the tandem piston assembly comprises a cylinder, a forward piston, a rearward piston, a forward piston shaft, a rearward piston tube, and a cylindrical bore;
   the rearward tubular crosshead being mounted adjacent and perpendicular to the gear pin crankshaft;
   the cylinder being concentrically positioned with the rearward tubular crosshead;
   the cylinder being mounted adjacent to the rearward tubular crosshead and the forward crosshead, opposite the gear pin crankshaft;

the forward piston and the rearward piston being slidably mounted with the cylinder;

the rearward piston tube being connected in between the rearward piston and the rearward tubular crosshead;

the cylindrical bore concentrically traversing through the rearward piston into the rearward piston tube;

the forward piston shaft being slidably positioned within the rearward piston tube; and the forward piston shaft being connected in between the forward crosshead and the forward piston.

4. The infinitely variable compression ratio mechanism of a reciprocating piston-type gas compressor as claimed in claim 1 comprises:

a mirror-image planetary-gear assembly;

the mirror-image planetary-gear assembly comprises a first planetary-gear assembly and a second planetary-gear assembly;

the first planetary-gear assembly and the second planetary-gear assembly each comprise a sun gear, a primary planet gear, a plurality of secondary planet gears, and a ring gear;

the first planetary-gear assembly and the second planetary-gear assembly being mounted offset from each other;

the sun gear from the first planetary-gear assembly and the sun gear from the second planetary-gear assembly being concentrically positioned with each other about a main rotation axis;

the primary planet gear from the first planetary-gear assembly and the primary planet gear from the second planetary-gear assembly being concentrically positioned with each other along a shared rotation axis;

the rearward piston rotation axis and the forward piston rotation axis being positioned parallel and offset with the shared rotation axis;

the gear pin crankshaft being torsionally connected in between the primary planet gear from the first planetary-gear assembly and the primary planet gear from the second planetary-gear assembly; and the forward piston rotation axis and the rearward piston rotation axis being positioned parallel and equally offset from the shared rotation axis.

5. The infinitely variable compression ratio mechanism of a reciprocating piston-type gas compressor as claimed in claim 4 comprises:

the first planetary-gear assembly and the second planetary-gear assembly gear assembly each further comprise a ratio-adjustment mounting shaft;

the ratio-adjustment mounting shaft being positioned adjacent to the sun gear, opposite the gear pin crankshaft; and the ratio-adjustment mounting shaft being torsionally and axially connected to the sun gear.

6. The infinitely variable compression ratio mechanism of a reciprocating piston-type gas compressor as claimed in claim 5 comprises:

a compressor block;

a crosshead housing;

the first planetary-gear assembly and the second planetary-gear assembly each further comprise a bearing;

the mirror-image planetary-gear assembly and the gear pin crankshaft being positioned within the compressor block;

the bearing being mounted within the compressor block, adjacent to the sun gear;

the ratio-adjustment mounting shaft being rotatably mounted to the compressor block with the bearing;

the crosshead housing being laterally mounted to the compressor block;

the rearward tubular crosshead being slidably mounted within the crosshead housing; and the tandem piston assembly being adjacently mounted to the crosshead housing, opposite the compressor block.

7. The infinitely variable compression ratio mechanism of a reciprocating piston-type gas compressor as claimed in claim 6 comprises:

a ratio-control shaft;

the first planetary-gear assembly and the second planetary-gear assembly each further comprise a control arm, an arc gear, and a drive-adjustment gear;

the ratio-control shaft being mounted parallel and offset to the ratio-adjustment mounting shaft;

the control arm being terminally and perpendicularly connected to the ratio-adjustment mounting shaft;

the arc gear being terminally connected to the control arm, opposite to the ratio-adjustment mounting shaft;

the drive-adjustment gear being concentrically connected about the ratio-control shaft; and the arc gear being mechanically engaged with the drive-adjustment gear.

8. The infinitely variable compression ratio mechanism of a reciprocating piston-type gas compressor as claimed in claim 5 comprises:

the first planetary-gear assembly and the second planetary-gear assembly gear assembly each further comprise an eccentric annular external-counterweight;

the eccentric annular external-counterweight being positioned adjacent to the primary planet gear and the plurality of secondary planet gears, opposite the gear pin crankshaft;

the eccentric annular external-counterweight being positioned around the ratio-adjustment mounting shaft;

the eccentric annular external-counterweight being rotatably mounted to the primary planet gear and each of the plurality of secondary planet gears; and a center of gravity of the eccentric annular external-counterweight and the shared rotation axis being positioned opposite to each other about the ratio-adjustment mounting shaft.

9. The infinitely variable compression ratio mechanism of a reciprocating piston-type gas compressor as claimed in claim 5 comprises:

a driving power shaft;

a compressor block;

the mirror-image planetary-gear assembly and the gear pin crankshaft being rotatably mounted within the compressor block;

the driving power shaft being positioned parallel and offset to the main rotation axis;

the driving power shaft being rotatably mounted within the compressor block;

the ring gear from the first planetary-gear assembly being torsionally coupled to the driving power shaft; and the ring gear from the second planetary-gear assembly being torsionally coupled to the driving power shaft.

10. The infinitely variable compression ratio mechanism of a reciprocating piston-type gas compressor as claimed in claim 9 comprises:

the ring gear being an inner-external ring gear;

the inner-external ring gear comprises an external ring gear and an inner ring gear;

the first planetary-gear assembly further comprise a driving gear;

the driving gear being concentrically connected about the driving power shaft;

the driving gear being positioned coplanar with the inner-external ring gear;

the external ring gear being mechanically engaged to the driving gear; and the primary planet gear and each of the plurality of secondary planet gears being mechanically engaged to the inner ring gear.

11. The infinitely variable compression ratio mechanism of a reciprocating piston-type gas compressor as claimed in claim 9 comprises:

the ring gear being an inner-external ring gear;

the inner-external ring gear comprises an external ring gear and an inner ring gear;

the second planetary-gear assembly further comprise a driving gear;

the driving gear being concentrically connected about the driving power shaft;

the driving gear being positioned coplanar with the inner-external ring gear;

the external ring gear being mechanically engaged to the driving gear; and the primary planet gear and each of the plurality of secondary planet gears being mechanically engaged to the inner ring gear.

12. The infinitely variable compression ratio mechanism of a reciprocating piston-type gas compressor as claimed in claim 4, wherein a main tooth ratio between the sun gear, the plurality of secondary planet gears and the primary planet gear, and the ring gear is 1:1:3.

13. The infinitely variable compression ratio mechanism of a reciprocating piston-type gas compressor as claimed in claim 2 comprises:

the rearward tubular crosshead comprising an elongated sliding body, an inner channel, and an inner cylindrical bore;

the inner channel traversing into and along the elongated sliding body;

the inner channel being oriented towards the gear pin crankshaft;

the first rearward rod and the second rearward rod being positioned opposite to each other, across the inner channel;

the forward crosshead being slidably positioned within and along the inner channel;

the inner cylindrical bore traversing through the elongated sliding body from the inner channel;

a forward piston shaft of the tandem piston assembly being positioned within the inner cylindrical bore;

the forward piston shaft being terminally connected to forward crosshead;

a rearward piston tube being positioned adjacent to the elongated sliding body, opposite to the forward crosshead; and the rearward piston tube being terminally connected to the sliding body, about the inner cylindrical bore.

* * * * *